UNITED STATES PATENT OFFICE.

THEOPHILE AUGUSTE BREITHAUPT, OF CARLSRUHE, GRAND DUCHY OF BADEN.

IMPROVEMENT IN PROCESSES OF PRESERVING HOPS.

Specification forming part of Letters Patent No. 154,215, dated August 18, 1874; application filed July 30, 1874.

*To all whom it may concern:*

Be it known that I, THEOPHILE AUGUSTE BREITHAUPT, of Carlsruhe, in the Grand Duchy of Baden, have invented an Improved Process for Preserving Hops, of which the following is a specification:

The usual means of preserving hops practiced at the present day is by sulphurization and perfection of drying. In consequence of the sulphurization the hops acquire a more presentable aspect and do not mold, but their elements become transformed, which results in the deterioration of the manufactured beers and consequent injury to the health of the users: First, the tannic acid, under the influence of the sulphurized acid which passes through the hops, is transformed into gallic acid, which prevents the fermentation of the beer, and which communicates a harsh or biting taste. Second, the essential oil, the aroma of the hops contained in the lupulia secreted by microscopic glands surmounted with vesicles, is transformed into valerianic acid, and forms, with the sulphur, a solid body. In this manner the greasy matter, which without sulphur becomes rancid and produces mold, is destroyed and the hops preserved, but their flavor disappears and the beers never possess it. Third, sulphurous acid is transformed easily into sulphuric acid, and, as the sulphur of commerce is arseniferous, gives off, during the sulphurization, some arsenious acid, which passes at the same time into the beer, and may, as well as the sulphuric acid, though in a smaller degree, incommode the consumer.

To remedy all these inconveniences and preserve the hops without deterioration was a problem which I set myself to work out, and which I have at length resolved.

I separate by chemical and mechanical means the essential oil of the fresh or freshly-dried hops in such manner that the strobiles will remain almost entire, keeping their natural color, their yellow powder, and all the bitter and tannic principle.

The hops, after the operation, are completely dried and pressed, and will keep during entire years. The essential oil, liquid, green, clear, and very aromatic, is preserved, in part, in hermetically-sealed flasks, and improves year after year.

In the manufacture of beer my hops are operated with in the ordinary manner. The extraction of the bitter principle and of the tannin, the clarification, and the fermentation are perfectly effected. Before drawing it off into the keeping-tuns, there is put into the beer from three to five drops of the essential oil per bushel. This essence communicates to the beer the aroma of the hops, and contributes much to its preservation in destroying, by its odor, the animalcules, which, by their presence in beers, produce an acetic and putrid fermentation.

The beer thus made is of very superior quality, clear and creamy. It is distinguished for its delicious hop flavor and is not dear.

I operate by introducing the fresh or freshly-dried hops into spacious double walled or jacketed vessels. Closing them hermetically, I introduce a constant current of vapor in the jacket to elevate the interior temperature of the apparatus. Then I cause a light current of steam to pass through the hops, in order to provoke the rupture of the vesicles containing the essential oil. Finally I cause to pass through them a strong current of air, which, under the influence of the surrounding heat, and of the little vapor with which the hops are impregnated, carries away the essential oil by a goose-neck and a condenser, in order that the little essence that may have been able to volatilize itself may be condensed into a Florentine receiver, where I gather it, and in a little time the hops are thus deprived of their essential oil. Afterward I produce a vacuum in the apparatus to extract from the hops nearly all their natural moisture; then I complete the desiccation by air, and compress and bale it carefully.

It may be seen that I might obtain the essential oil by absorption simply by the aid of a vacuum, and without its being necessary to pass into the apparatus the strong current of air which I have just indicated to produce the extraction of the oil. It suffices in effect, in this case, to interpose between the pump and the apparatus which contains the hops a receiver, in which the deducting-tube which unites them opens.

What I claim as new, and desire to secure by Letters Patent, is—

The process of preserving hops, consisting in the separation of the essential oil, and the preservation separately of this oil and the other part of the hops, dried and pressed in the ordinary manner, substantially as herein described.

T. A. BREITHAUPT.

In presence of—
  W. H. YOUNG,
  F. M. YOUNG.